US005566318A

United States Patent [19]
Joseph

[11] Patent Number: 5,566,318
[45] Date of Patent: Oct. 15, 1996

[54] CIRCUIT WITH A SINGLE ADDRESS REGISTER THAT AUGMENTS A MEMORY CONTROLLER BY ENABLING CACHE READS AND PAGE-MODE WRITES

[75] Inventor: James D. Joseph, Monument, Colo.

[73] Assignee: Ramtron International Corporation, Colorado Springs, Colo.

[21] Appl. No.: 284,384

[22] Filed: Aug. 2, 1994

[51] Int. Cl.$^6$ ..................................... G06F 12/00
[52] U.S. Cl. ...................... 395/445; 395/432; 365/230.08
[58] Field of Search .................................... 395/432, 465, 395/466, 444, 445, 446, 447, 456; 365/230.08, 233, 238.5

[56] References Cited

U.S. PATENT DOCUMENTS

| | | | |
|---|---|---|---|
| 4,068,301 | 1/1978 | Ishino et al. | 395/444 |
| 4,577,293 | 3/1986 | Matick et al. | 365/189.04 |
| 4,701,843 | 10/1987 | Cohen | 395/432 |
| 4,713,755 | 12/1987 | Worley, Jr. et al. | 395/375 |
| 4,794,567 | 12/1988 | Akatsuka | 365/189.05 |
| 4,870,622 | 9/1989 | Aria et al. | 365/230.02 |
| 4,882,709 | 11/1989 | Wyland | 365/189.02 |
| 4,933,910 | 6/1990 | Olson et al. | 365/238.5 |
| 5,014,188 | 5/1991 | Kawamura | 395/403 |
| 5,184,320 | 2/1993 | Dye | 365/49 |
| 5,226,139 | 7/1993 | Fujishima et al. | 395/403 |
| 5,247,639 | 9/1993 | Yamahata | 395/465 |
| 5,297,270 | 3/1994 | Olson | 395/403 |
| 5,329,489 | 7/1994 | Diefendorff | 365/189.05 |
| 5,410,669 | 4/1995 | Biggs et al. | 395/445 |
| 5,421,000 | 5/1995 | Fortino et al. | 395/445 |
| 5,432,918 | 7/1995 | Stamm | 395/483 |

OTHER PUBLICATIONS

Niijima, Hideto and Oba, Nobuyuki, "QRAM–Quick Access Memory System," *Computer Design—ICCD '90, 1990 Int.'l Conf.*, pp. 417–420.

Ramtron International Corporation, DM1M36SJ/DM1M32SJ, 1Mbx36/1Mbx32 Enhanced DRAM SIMM, Product Specification, R5 012694, 1994, pp. 2–35 thru 2–53.
Bondurant, David W., Fast Access Time/High Bandwidth DRAM Product Comparison, Ramtron International Corporation, pp. 1–8.
Ramtron International Corporation, 15ns Enhanced Dynamic RAM Family, Product Summary, R2 083093, 1993, pp. 1–2.
Ramtron International Corporation, Estimating EDRAM Operating Power, Application Note, R1 011893, 1993, pp. 1–4.
Ramtron International Corporation, Applying The Enhanced DRAM To 386/486DX Computers, Application Note, R1 040192, 1992, pp. 1–12.
Ramtron International Corporation, Initializing The Enhanced DRAM, Application Note, R1 103092, 1992, pp. 1–2.
Bursky, Dave, Avoid Wait States By Building Simple, Compact 50–MHz Systems With Cached DRAMS. Combination DRAM–SRAM Removes Secondary Caches, *Electronic Design*, Jan. 23, 1992, pp. 39–40, 42–43.
DIGICOM, We Don't Waste Cache with SRAM, DIGIS–486EL Vesa Main Board Specification, pp. 1–4.

*Primary Examiner*—Tod R. Swann
*Assistant Examiner*—Keith W. Saunders
*Attorney, Agent, or Firm*—William J. Kubida; Richard A. Bachand; Holland & Hart LLP

[57] ABSTRACT

A single address register control technique for a memory controller allows both cache "reads" and page-mode "writes" to be implemented without requiring separate hardware address registers for each function. Because both functions may be implemented with virtually no performance loss in a high performance memory system using a single address register, a comparator, and one additional register, the costs and other disadvantages inherent in otherwise replicating control registers are obviated.

16 Claims, 7 Drawing Sheets

CIRCUIT WITH A SINGLE ADDRESS REGISTER THAT AUGMENTS A MEMORY CONTROLLER BY ENABLING CACHE READS AND PAGE-MODE WRITES

BACKGROUND OF THE INVENTION

The present invention relates, in general, to a single register control technique for a memory controller. More particularly, the present invention relates to a single register control technique for a memory controller in conjunction with a dynamic random access memory ("DRAM") array incorporating an onboard static RAM ("SRAM") cache which allows for readily implemented circuitry facilitating cache reads and page-mode writes.

The performance of computer central processing units ("CPU") has increased dramatically in recent years and has far exceeded that of any corresponding increase in the performance of main memory DRAM. In addition, the performance demands placed on main memory from computer input/output ("I/O") devices has also increased as well. As a consequence, DRAM main memory performance has been improved by utilizing faster SRAM cache memory to retain the most commonly accessed data. In some CPUs, this cache memory may be integrated directly with the processor chip in order to maximize the cache performance and system bandwidth. Nevertheless, sufficient SRAM cannot generally be integrated with the CPU chip for the possible range of applications, and ultimately it is the DRAM main memory access time and bandwidth which are the ultimate constraints in achieving maximum CPU performance.

On the other hand, overall computer I/O performance may also be improved by providing faster or "local" processor busses. In addition, where feasible, the I/O computation and local memory requirements of basic computer I/O devices may be distributed to the devices themselves in order to reduce the main memory bus bandwidth. Regardless of the techniques employed, the net result is generally more complicated and expensive hardware and the current trend involves locating I/O devices to the processor local bus for higher performance and overall lower systems cost.

In either instance, ever more rapidly increasing CPU and I/O performance point out the need for even higher bandwidth and faster access time DRAM main memory. Standard DRAM bandwidth may, to some extent, be improved by interleaving multiple memory banks and increasing bus widths. However, such approaches are ultimately only an attempt to work around the inherently slow access time provided by current DRAM technology and do not directly address the generally poor access times or inherent "wait" states required to access a new page of memory. Because of this, secondary external SRAM cache memory has been utilized to minimize the number of page misses experienced by the processor. However, such techniques tend to result in a more complex design as well as higher system cost and power requirements.

As a consequence, a number of specialty DRAM products have recently been introduced which obviate the need for external SRAM cache memory and DRAM interleaving. Among these devices are the Mitsubishi Cached DRAM ("CDRAM") and the proprietary Enhanced DRAM ("EDRAM™") developed by Ramtron International Corporation, 1850 Ramtron Drive, Colorado Springs, Colo. 80921, assignee of the present invention. The Ramtron EDRAM integrates an SRAM cache memory with a fast thirty five nanosecond access DRAM on a single chip. Among the benefits of this device are improved DRAM performance due to the fact that the current row of data being accessed from the memory array is held in a true SRAM cache memory which may be asynchronously accessed by the CPU in as little as fifteen nanoseconds. Should a cache "miss" be detected, the entire cache memory is refilled from the DRAM memory array in as little as thirty-five nanoseconds over a 256 byte DRAM-to-cache memory bus. The EDRAM also utilizes an on-chip write posting register to perform write operations in fifteen nanoseconds and burst writes within a page are also performed at a similar rate of fifteen nanoseconds per word and an on-chip "hit"/"miss" comparator automatically maintains cache coherency.

Both the CDRAM and the EDRAM require specific controller designs to fully implement their features. In the former instance, the memory controller requires a cache controller with tag RAM and DRAM controller functions. In the latter instance, the controller may be implemented in a more straightforward manner due to the inherently less complex page cache algorithm employed. Nevertheless, a memory controller for either the CDRAM or the EDRAM which supports both cache reads as well as page-mode writes at high speed, has heretofore required both a last-row read register (to determine cache "hits") and a separate last-row written register (to facilitate page/mode "writes") requiring additional hardware in the memory controller design. The necessity of incorporating separate last-row read and last-row written registers adds to the overall cost of the memory controller to such an undesired extent that most designers and manufacturers will choose to omit the latter feature rather than incorporate the additional hardware necessary to implement it.

SUMMARY OF THE INVENTION

The single register control technique for a memory controller disclosed herein allows both cache "reads" ("read hits") and page-mode "writes" to be implemented in a single register/comparator combination. Because both features may be implemented with a single register/comparator, the costs and other disadvantages inherent in replicating control registers for both a last row read and last row written function are obviated. The single register control technique of the present invention allows use of both cache "reads" and page-mode "writes" with virtually no performance loss in a high performance memory system.

Specifically disclosed is a single n-bit register and associated n-bit comparator with a single one-bit register which tracks the last processor memory I/O operation (either "read" or "write"). The n-bit "row" address is fed to the n-bit register and the n-bit comparator to provide an indication of a cache "hit" or "miss". The single bit last operation register supplies the memory controller with an indication of whether the last operation of the processor to the computer memory was either a "read" or "write".

Broadly, what is disclosed herein is a memory controller for a memory device incorporating a primary memory array and a secondary cache memory for an associated data processor. The memory device includes a last-row read register for indicating an address of the last-row read from the memory device by the data processor. The memory controller comprises an n-bit register having a data input bus coupled to receive an address signal representative of the address indicated in the last-row read register. A clock terminal of the n-bit register is coupled to receive a clocking signal and the register further includes an output bus for supplying an output signal representative of the address signal when the clocking signal is in a given binary state thereof. An n-bit comparator has first and second input terminals thereof coupled respectively to the data input and output busses of the n-bit register. The n-bit comparator provides a first signal when the address and output signals are coincident and a second signal when the address and output signals are not coincident.

In a more particular embodiment, the memory controller further includes an additional register having a data input terminal coupled to receive a write/read operation signal from the associated data processor indicative of either a "write" or "read" operation to the memory device by the data processor. A clock terminal of the additional register is coupled to receive an operation cycle signal. The additional register has an output terminal thereof for supplying an output signal representative of a previous state of the write/read operation signal when the operation cycle signal is in a predetermined binary state thereof.

Further disclosed herein is a computer including a central data processor and a memory controller for an associated memory module wherein the memory module includes a plurality of memory devices incorporating a primary memory array and a secondary cache memory. The memory module includes a last-row read register for indicating an address of the last row read from the memory module by the data processor. The memory controller incorporates a single register control circuit in accordance with the principles of the present invention.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings wherein.

DESCRIPTION OF A PREFERRED EMBODIMENT

Figure 1:
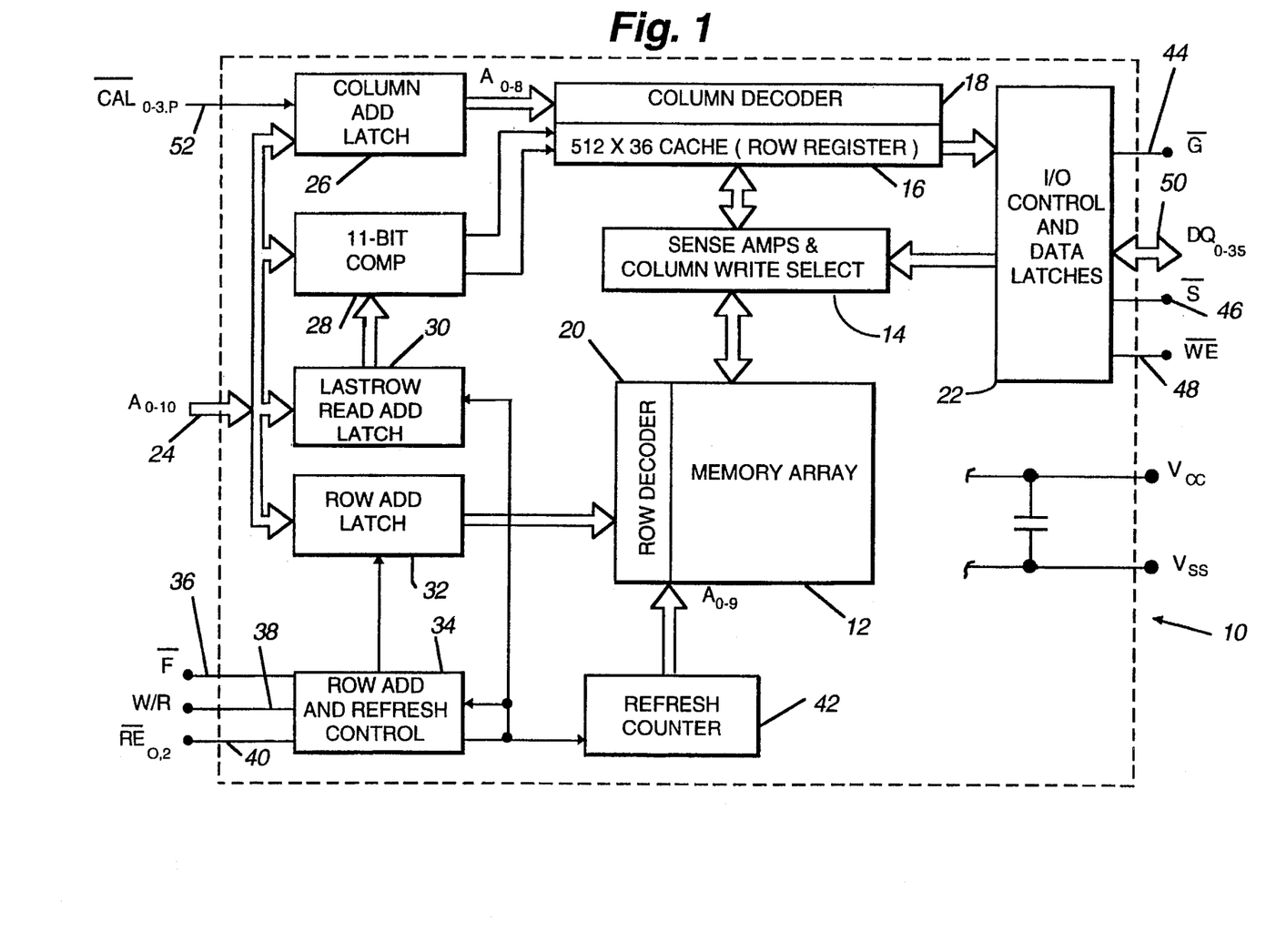
FIG. 1 is a functional logic block diagram of a representative memory chip exemplary of a type of device incorporating a DRAM memory array and an associated SRAM cache including an internal last-row read address latch for use in conjunction with the single register control technique in accordance with the present invention.

With reference now to FIG. 1, a memory chip 10 for utilization in implementation of the single register control technique for a memory controller of the present invention is shown. The memory chip 10 may, in a preferred embodiment, comprise, for example, a DM2202 enhanced DRAM ("EDRAM") available from Ramtron International Corporation, assignee of the present invention. Utilizing the DM2202 as a portion of a DM1M36SJ single in-line memory module ("SIMM") shown hereinafter in FIG. 2 and described as an example only, the DRAM memory array 12 will comprise a 4 Mbyte memory array.

The memory chip 10 further includes sense amps and column write select circuitry 14 bi-directionally coupled to the DRAM memory array 12 between a SRAM cache 16 which, in conjunction with the particular memory chip 10 shown, comprises a 512×36 cache as shown. Column decoder 18 is associated with the SRAM cache for providing access to the desired column of the SRAM cache 16. Row decoder 20, associated with DRAM memory array 12, allows access to particular rows of the DRAM memory array 12.

I/O control and data latches 22 provide control signals to the sense amps and column write select circuitry 14, as well as receiving data from the SRAM cache 16. A multiplexed address bus 24 ("$A_{0-10}$") is utilized to provide control inputs to column address latch 26, comparator 28, last-row read ("LRR") address latch 30, as well as row-address latch 32 as shown. A portion of the multiplexed address bus 24 comprising address lines $A_{0-8}$ is provided as input to column decoder 18. A control output of comparator 28 provides control input to SRAM cache 16 as shown.

Row-address and refresh control 34 receives a refresh signal on refresh ("/F") line 36, a write/read signal on write/read ("W/R") line 38 and a row enable signal on row enable ("/RE") line 40. Row address and refresh control 34 provides a control input to row address latch 32 as well as refresh counter 42, last-row read address latch 30 and the SRAM cache 16. Refresh counter 42 is coupled via address lines $A_{0-9}$ to the DRAM memory array 12.

I/O control and data latches 22 receives inputs on output enable ("/G") line 44, chip select ("/S") line 46 and write enable ("/WE") line 48. Data input/output ("DQ") lines 50 provide a bidirectional input for data on lines $DQ_{0-35}$. Column address latch 26 receives inputs on column address latch ("/CAL") line 52 as will be more fully described hereinafter.

The following describes the various input and output signals to the memory chip 10 in more detail:

$/RE_{0-2}$: Row Enable is the main selection input signal. Asserting /RE while /S is low activates all on-chip circuitry necessary to access data from the DRAM memory array 12. In addition to powering up the device, the high-to-low transition of /RE captures the row addresses presented by the controller on the multiplexed address bus 24 as well as the states of W/R and /F. /$RE_0$ controls bytes one and two. /$RE_2$ controls bytes three, four and parity.

/CAL0–3,P: Column Address Latch, /CAL, controls the operation of the column address. When /CAL is "high", the column address latch 26 is transparent. When /CAL is "low", the column address latch is closed and the output of the latch contains the column address value previously presented to the latch during the time that /CAL was "high", provided that all setup and hold conditions have been met. /CAL can be toggled when /RE is "low" or "high". However, /CAL must be "high" during the high-to-low transition of /RE except for /F refresh cycles. /CAL provides an additional function during "write" operations. /CAL must be "low" simultaneously with the write enable control signal, /WE, in order to execute a write to memory. The use of /CAL during "write" operations allows early posting of input data, via /WE, prior to the presence of a valid column address or early latching of addresses prior to the arrival of data, as might be used with the Intel Pentium® processor. Multiple /CAL control signals provide individual byte control. /$CAL_{0-3}$ are associated with byte one through four, respectively, and /$CAL_p$ is associated with the four parity bits.

W/R: Write/Read mode is polled during the high-to-low transition of /RE. The state of W/R determines what type of cycle is to be executed. If W/R is "high" during the falling edge of /RE, a "write" operation is queued, but a "write" operation will not occur unless /WE, /CAL and /S are asserted. If /WE does not occur during a "write" cycle, the memory will execute an /RE-only refresh cycle.

If W/R is low during the falling edge of /RE, a "read" operation is queued, but a "read" operation will not occur unless /S and /G are asserted. Dummy cycles where W/R and /S are low and /G is not asserted are not advisable as /RE-only refresh cycles since the last row read address register and the 2K cache will be altered during this operation. In addition to selecting whether a "read" or "write" operation is to be performed, W/R performs several other functions. During "read" operations where W/R is low during the high-to-low transition of /RE and the row address is not equal to the last row read (cache "miss"), then the last row read address latch and the 2K cache are updated. When a "write" operation is executed, and W/R is "high" at the falling edge of /RE, the last row read address latch and cache are not updated. However, if the present row address is the same as that contained in the last row read address latch (write "hit"), the 2K cache and the DRAM array will be modified by the write operation (/WE, /S and /CAL low).

/F: Refresh Mode, /F, is polled on the assertion of /RE. When /F is detected by the falling edge of /RE as active (low), an internal refresh cycle is executed. An internal counter supplies the row address field. The refresh counter is incremented at the end of the /RE cycle in preparation for the next /F type refresh cycle. When /F type refreshing is used, at least 1,024 /F cycles must be executed every 64 mS. Cache "read" cycles can be performed during /F refresh cycles by changing the column addresses and optionally toggling /CAL and /G (/S=low).

/WE: Write Enable, /WE, is an asynchronous control signal used in conjunction with /CAL to execute write cycles as will be more fully described hereinafter. For "write" cycles, /WE must be high when /RE initiates the write cycle. During the falling edge of /WE, the input data value is captured. The actual write operation does not occur until /WE and /CAL are simultaneously active and the device has been selected by asserting /S. During "read" operations, where W/R was low during the high-to-low transition of /RE, the /WE input is internally inhibited so that /WE can be in an indeterminate state during the entire cycle.

/G: Output Enable, /G, controls the data output impedance. A "low" on /G enables the output data driver, provided that all other conditions are met for a read access. A "high" level on /G turns off the output data driver. Enabling /G alone has little impact on operating power, except for I/O current. During a "write" with a cache "miss", the output will remain at a "high" impedance independent of /G.

/S: (Chip) Select, /S, is used to power up the I/O and clock circuitry. When /S is "high", the memory chip 10 remains in a powered-down condition; "read" and "write" cycles cannot be executed while /S is "high". /S must remain active throughout any "read" or "write" operation. Only the /F refresh operation can be executed when /S is "high".

DQ: Data Input is captured by the falling edge of /WE and is written into the selected storage location during a valid "write" cycle. Data Output is available when /S and /G are asserted during "read" cycles or "write" hit cycles. Write-per-bit masking is used to selectively write parity bits. This is accomplished by multiplexing the "mask" bits and data-in bits on the I/O pins. Mask bit captures are on the falling edge of /RE, and data bit captures are on the falling edge of /WE. Byte write selection to non-parity bits is accomplished via /$CAL_{0-3}$ selection.

$A_0$–$A_{10}$: Eleven address inputs, $A_0$ through $A_{10}$, are time division multiplexed in a two-dimensional fashion by the external controller, where row addresses (X) are presented to the device during the falling edge of /RE and the column addresses (Y) are presented after the row address hold time has been satisfied. The memory chip 10 allows either latched column address operation or ripple-through operation (also known as static column decode). Although the memory chip 10 captures eleven addresses during the falling edge of /RE, only ten of these addresses ($A_0$–$A_9$) are used for refresh. If /RE-only refresh is used, "write" cycles must be executed to all binary combinations of row addresses $A_0$–$A_9$ every refresh interval. Addressing of the memory chip 10 uses eleven row addresses, $A_0$–$A_{10}$, and nine column addresses, $A_0$–$A_8$, permitting 512 36-bit words to be directly accessed from the on-chip cache.

Figure 2:
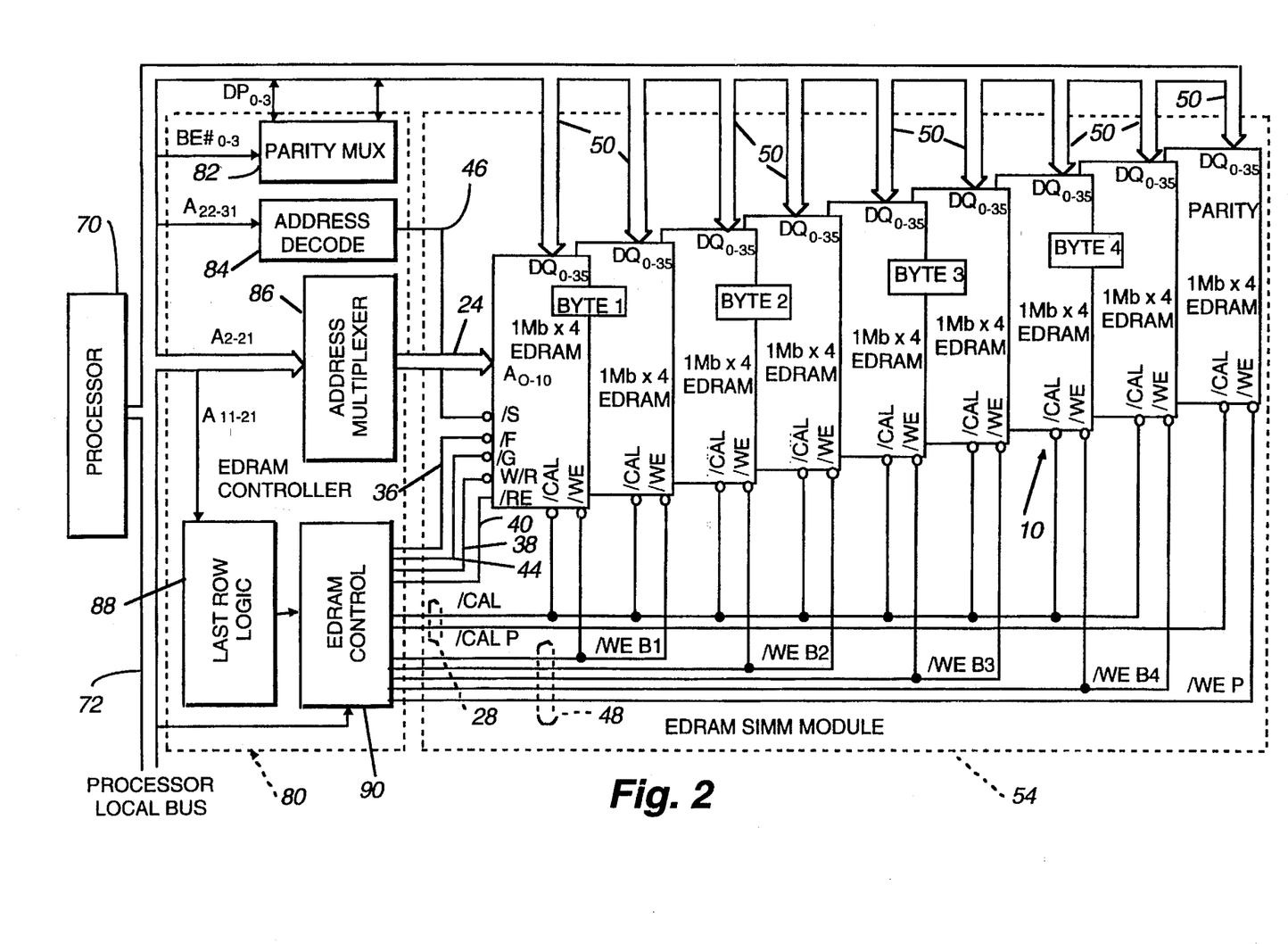
FIG. 2 is an expanded logic block diagram consisting of a memory module incorporating multiple memory chips of FIG. 1 in conjunction with a particular central processor, for example, an Intel® 80386/80486 CPU, and a module controller incorporating a last-row logic block for use in conjunction with the single register control technique of the present invention.

With reference additionally now to FIG. 2, an expanded logic block diagram of a memory module 54, comprising an EDRAM SIMM module incorporating a number of the memory chips 10 illustrated in FIG. 1, is shown in conjunction with a central processor 70. Although only a single memory module 54 is illustrated, it should be noted that the single register control technique of the present invention may be utilized in conjunction with multiple memory modules 54. Processor 70 may, in a preferred embodiment, comprise an Intel 80386/80486 or Pentium microprocessor. Processor 70 is coupled to a local bus 72 for interfacing with the memory module 54 as well as a memory module controller 80 in accordance with the present invention.

Memory module controller 80 comprises, in pertinent part, a parity multiplexer ("MUX") 82, an address decode logic 84, as well as an address multiplexer 86. Address multiplexer 86 is coupled to the local bus 72 by address lines $A_{2-21}$ which are separate from the multiplexed address bus 24 shown in FIG. 1. Additionally, memory module controller 80 comprises a last-row logic block 88 in operative association with a memory module control block 90, illustrated as an EDRAM controller when utilized in conjunction with an EDRAM memory module 10. As illustrated in this Figure, like structure to that above described with respect to the memory chip 10 of FIG. 1 is like-numbered and the foregoing description thereof shall suffice herefor. As illustrated in more detail, the memory module 54 may comprise 8 1 Mb×4 memory devices in conjunction with a 1 Mb×4 parity element.

Figure 3:
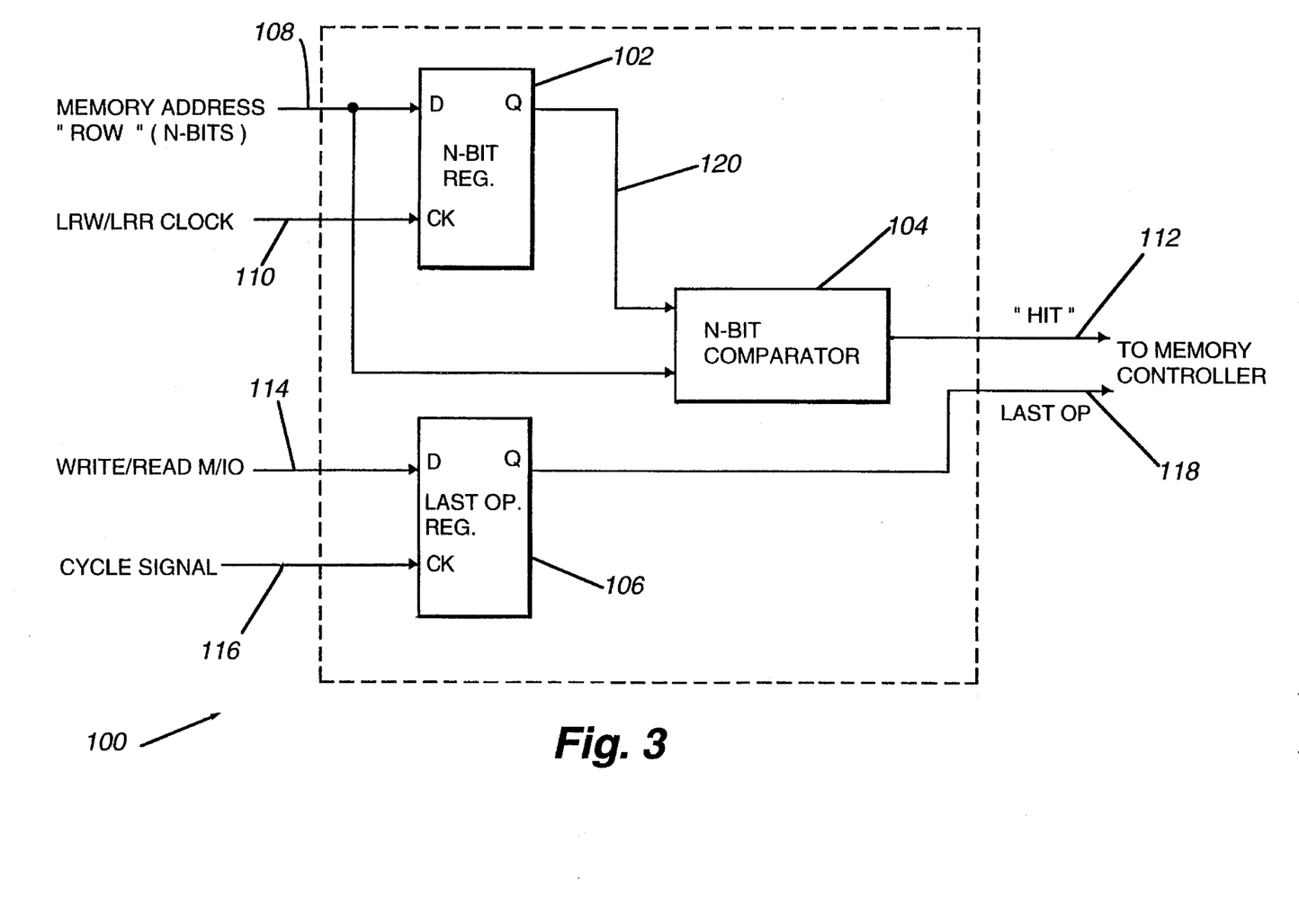
FIG. 3 is a logic block diagram of a single register control circuit of the present invention for utilization in conjunction with the memory module controller of FIG. 2.

With reference additionally now to FIG. 3, a single register control circuit 100 in accordance with the present invention is shown. Single register control circuit 100 comprises, in pertinent part, an n-bit register 102 and an associated n-bit comparator 104. Single register control circuit 100 also comprises an associated last operation ("LASTOP") register 106.

A memory address bus 108, coupled to the local processor bus 72 shown in FIG. 2, provides a memory address, or "row" signal of n-bits to the data ("D") input of n-input register 102, as well as providing one input to the n-bit comparator 104. A last-row written ("LRW")/LRR clock signal is supplied on clock line 110 to the clock ("CK") or latch enable ("LE") input of n-bit register 102.

A write/read memory input/output signal is supplied on line 114 to the data input of LASTOP register 106. LASTOP register 106 also receives a cycle signal on cycle signal line 116 to the CK input thereof. The output of LASTOP register 106 is supplied to the memory module control block 90 of the memory module controller 80 on LASTOP line 118 indicative of whether the last processor I/O operation to memory was a "write" or "read" operation.

The output of the n-bit register 102 taken at the output ("Q") line 120 is supplied as a second input to the n-bit comparator 104. The output of the n-bit comparator 104 supplies an indication of a "hit" or "/hit" (i.e. a "miss") to the memory module control block 90 of the memory module controller 80 indicative of whether or not the I/O operation to memory has resulted in a "hit" with respect to the contents of the SRAM cache 16.

The gating of the n-bit register 102 is done under the following conditions, assuming that: "hit"=1=True; "/hit"= 0=False; "LASTOP"=1="Write"; and "LASTOP"=0= "Read"; "/hit"=>"miss".

The n-bit register 102 clock=Read * /hit+Write * /Page_ Mode. In other words, if a "Read" cycle is beginning that is not an SRAM cache 16 "hit", or a "Write" cycle is beginning in a new page, the n-bit register 102 is gated. The following truth table of Table 1. pertains:

TABLE 1

| Current Op. | Last Op. | HIT | Condition |
|---|---|---|---|
| 1) Read | Read | 1 | Cache Read |
| 2) Read | Read | 0 | non-Cache Read |
| 3) Read | Write | x | non-Cache Read |
| 4) Write | Read | x | Begin Write (New Pg) |
| 5) Write | Write | 1 | Page-Mode Write |
| 6) Write | Write | 0 | Begin Write (New Pg) |

The results illustrated in the preceding Table 1. can be seen to be exactly the same as the results which would otherwise be obtained utilizing two or more separate comparators, except for the operation listed at line 3). If the operation in line 3) happened to be a cache "read" followed by a "write" followed by a "read" to the cache again, then a multiple-comparator scheme would note the cache "read" while the single-comparator result would be a non-cache "read", which takes more time. However, this condition seldom occurs in well-written code, particularly in video and signal processing applications.

Figure 4A:
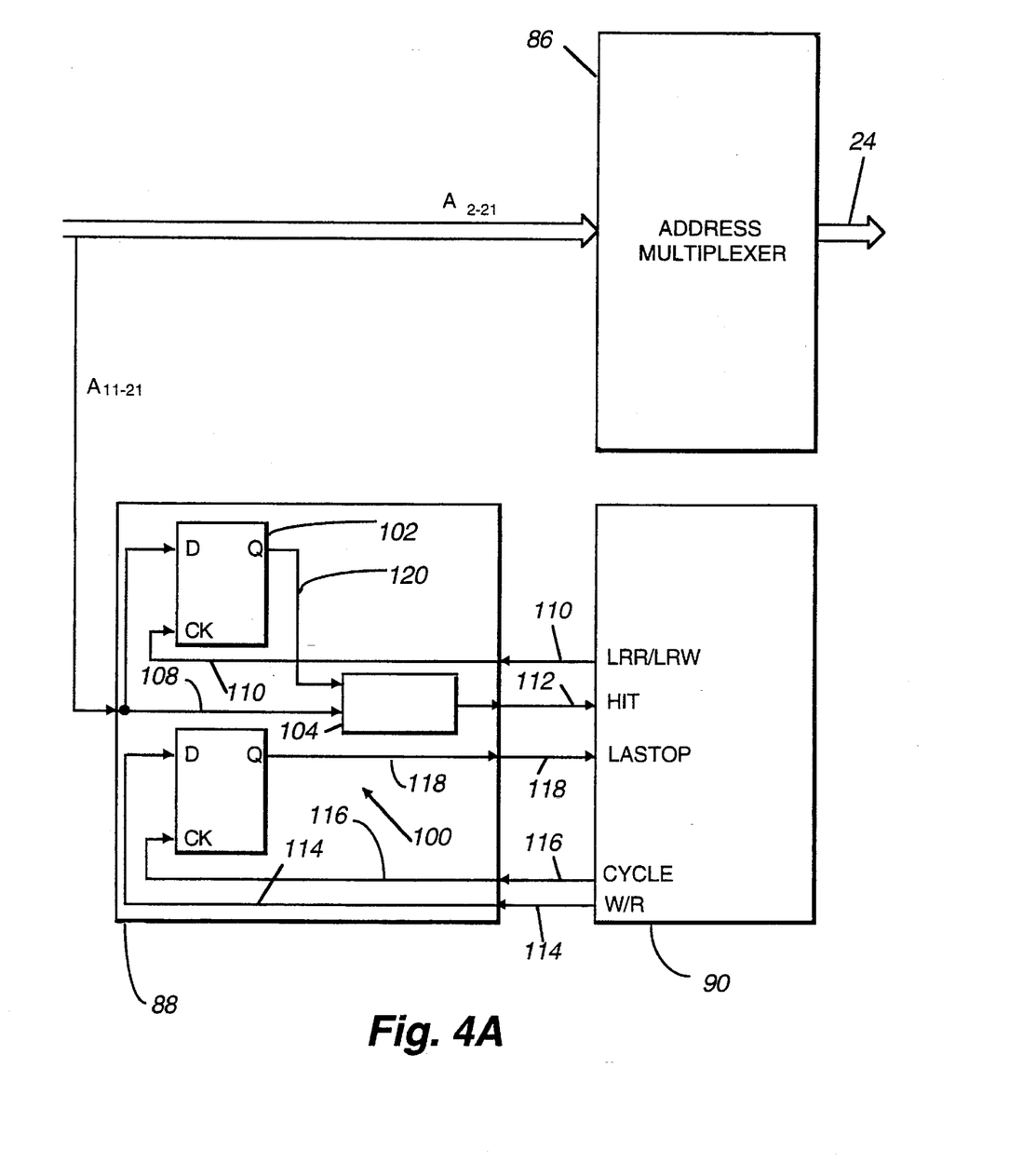
FIG. 4A is a logic block diagram of the single register control circuit of FIG. 3 illustrating its possible incorporation into the last row logic block of the memory module controller of FIG. 2.

With reference additionally now to FIG. 4A, the single register control circuit 100 of FIG. 3 is shown in association with the last-row logic block 88 and memory module control block 90 of the memory module controller 80 shown in FIG. 2. In this particular embodiment, the entire circuitry of the single register control circuit 100 is incorporated within the last-row logic block 88 to supply a "hit" signal on hit line 112 and a LASTOP signal on LASTOP line 118 to the memory module control block 90. The memory module control block 90 provides the LRR/LRW signal on line 110, a W/R signal on line 114 and a cycle clock signal on cycle signal line 116.

Figure 4B:
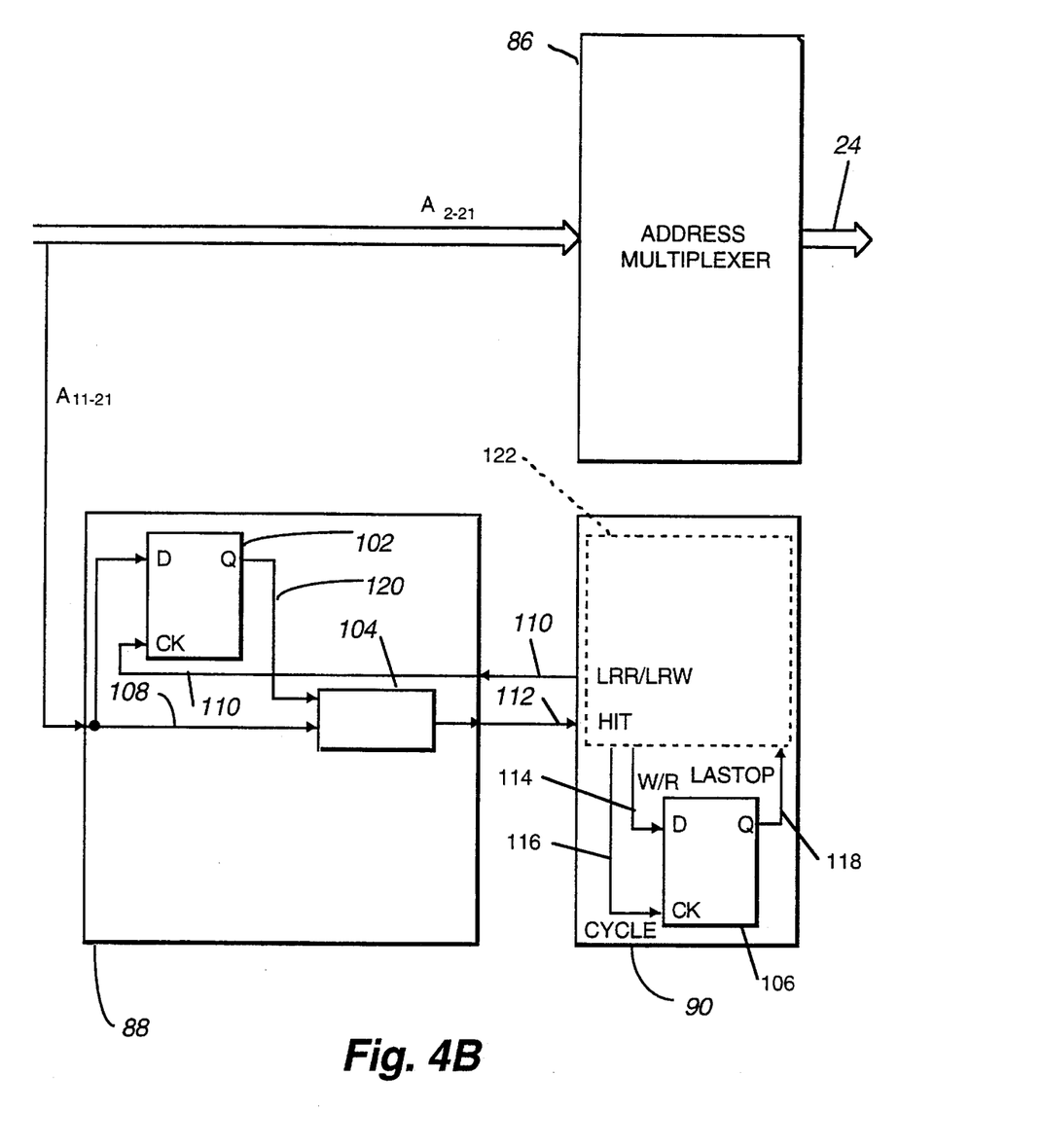
FIG. 4B is a logic block diagram of the single register control circuit of FIG. 3 illustrating a preferable incorporation of the single bit last operation register into an unused register of the memory module control block of the memory module controller of FIG. 2.

Referring additionally now to FIG. 4B, an alternative embodiment of the single register control circuit 100 is shown wherein the LASTOP register 106 is formed utilizing an unused D-type flip flop within the memory module control block 90 in order to further reduce the costs of implementing the single register control technique of the present invention. In this particular embodiment, the "hit" signal on hit line 112 is the only output from the last-row logic block 88 which need additionally be supplied to the memory module control block 90 and the LRR/LRW signal on line 110 is the only output that need additionally be supplied from the memory module control block 90 to the last-row logic block 88. As shown, the LASTOP register 106 when incorporated within the memory module control block 90 is in operative association with the controller subsystem 122 of the memory module control block 90.

Figure 5A:
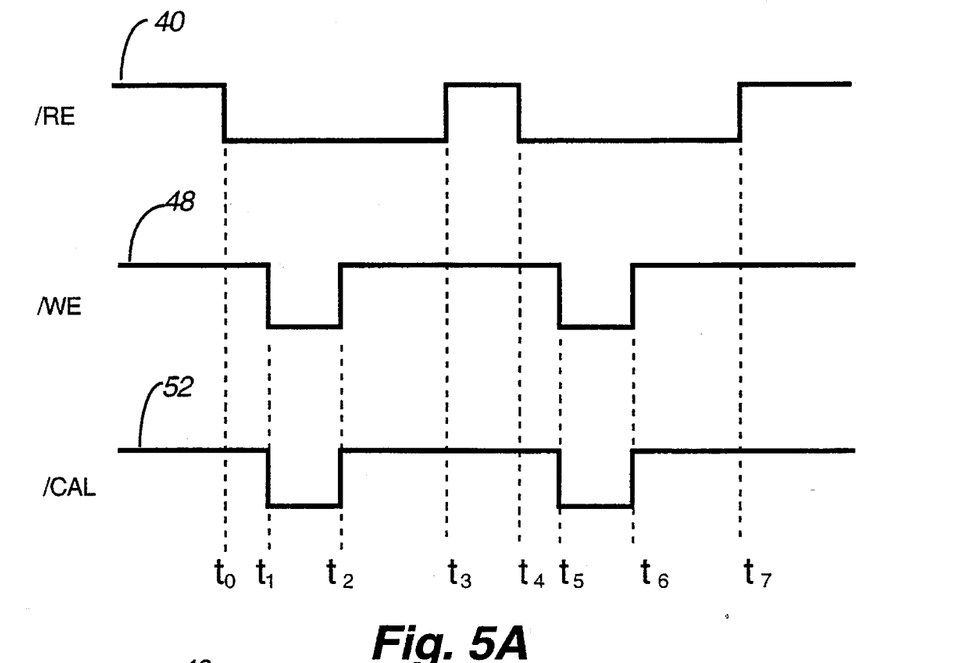
FIGS. 5A and 5B are simplified representations illustrating the relative timing of the row enable ("/RE"), write enable ("/WE"), and column address latch ("/CAL") signals in simple write and page-mode write operations respectively.
Figure 5B:
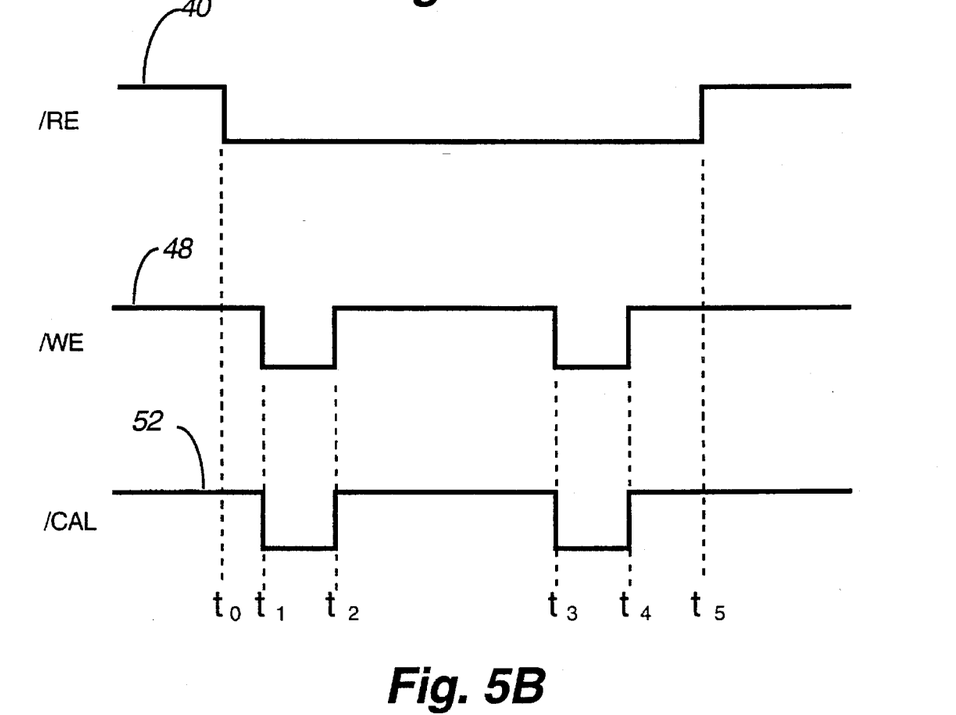

Referring additionally now to FIGS. 5A and 5B, a comparison of the signals appearing on the /RE line 40, /WE line 48, and /CAL line 52 are shown for a simple write and a page-mode write operations respectively. With particular reference to FIG. 5A, it can be seen that the /RE line 40 undergoes a negative transition at time $t_0$ followed by either /WE or /CAL at or about time $t_1$. The /WE and /CAL signals are then brought "high" at or about a time $t_2$ followed thereafter by a positive transition on /RE line 40 at time $t_3$. The next "write" operation takes place following the next negative going transition of the /RE signal at time $t_4$ followed by the more or less coincident negative going transitions on the /WE line 48 and /CAL line 52 at time $t_5$ which is again followed by a positive going transition at time $t_6$. As shown, the /RE line 40 is brought "high" again at a time $t_7$.

In contrast, in a page-mode "write" as shown in FIG. 5B, the signal on /RE line 40 is brought "low" at a time $t_0$ during which time a number of transitions, for example the two shown, may occur on the /WE line 48 and /CAL line 52. During the time that the /RE signal was held low, the /WE and /CAL signals are brought "low" at times $t_1$ and $t_3$ followed, respectively by positive going transitions at time $t_2$ and $t_4$. The /RE signal is again brought "high" at a time $t_5$ completing the page-mode write operation.

The following will describe the operation of read and write operations with respect to both cache "hits" and "misses":

Read Cycle to Last Row Read: Cache Hit If an /RE active read cycle is executed to a row address that matches the last row read address, the /RE cycle is internally terminated, independent of the external state of /RE and data is valid at the output.

/RE Inactive Cycle If /RE is high, SRAM cache 16 memory can be read under column address control. The SRAM cache 16 always contains data from the last row.

Read Cycle to Row Not LRR: Cache Miss If an /RE active read cycle is executed to a row address that does not match the LRR, than a DRAM memory array 12 "read" is started. The SRAM cache 16 memory (row register) is loaded with the DRAM memory array 12 data for the new row address enabling cache reads under column address control.

Write Cycle to LRR: Cache Hit If an /RE active write cycle is executed to a row address that matches the LRR, the following occurs:

1) DRAM memory array 12 access is started;
2) If /G is enabled, a SRAM cache 16 "read" is possible. This represents the special case of read-modify-write;
3) With /G disabled, input data is latched on the falling edge of /WE and the column address is latched on the falling edge of /CAL;
4) SRAM cache 16 and DRAM memory array 12 "writes" occur in parallel when /CAL and /WE are both enabled;
5) With /G enabled and /WE disabled, SRAM cache 16 "reads" are possible under column address control; and
6) When all desired "writes" to this row address are complete, /RE can be released enabling continued SRAM cache 16 "reads" and precharge.

Special Case of Write Hit: Read-Modify-Write During "write" cycles, prior to /WE going low to capture the input data, the SRAM cache 16 data can be read if three conditions are met:

1) /S is asserted which powers-up the device and enables the read/write circuitry;
2) /G is asserted to enable the output data buffers; and
3) the row address during the "write" operation matches the last row read.

During "write hit" cycles, data may be read from the SRAM cache 16 to perform read-modify-write, write-verify or read operations. "Read" access time during "write hit" cycles is dependent on when /CAL is asserted. If the row address does not match the last row read address, the output will go "high" impedance (tri-state) during the /RE active cycle regardless of the state of /G or /S.

Write Cycle to Row not LRR: Cache Miss If an /RE active "write" cycle is executed to a row address that does not match the LRR, the following occurs:

1) DRAM memory array 12 access is started from the new row address;
2) SRAM cache 16 memory is not loaded with DRAM memory array 12 data from the new row address;
3) Output is disabled independent of the state of /G;
4) "Write" data is latched on the falling edge of /WE;
5) When /CAL and /WE are both enabled, "write" occurs to the latched row and column addresses;
6) SRAM cache 16 memory (the data from the LRR) can be read when /RE is brought high;
7) If /CAL and /WE are not both earlier enabled, this cycle provides an /RE only refresh to the selected row and the data remains unmodified.

Figure 6:
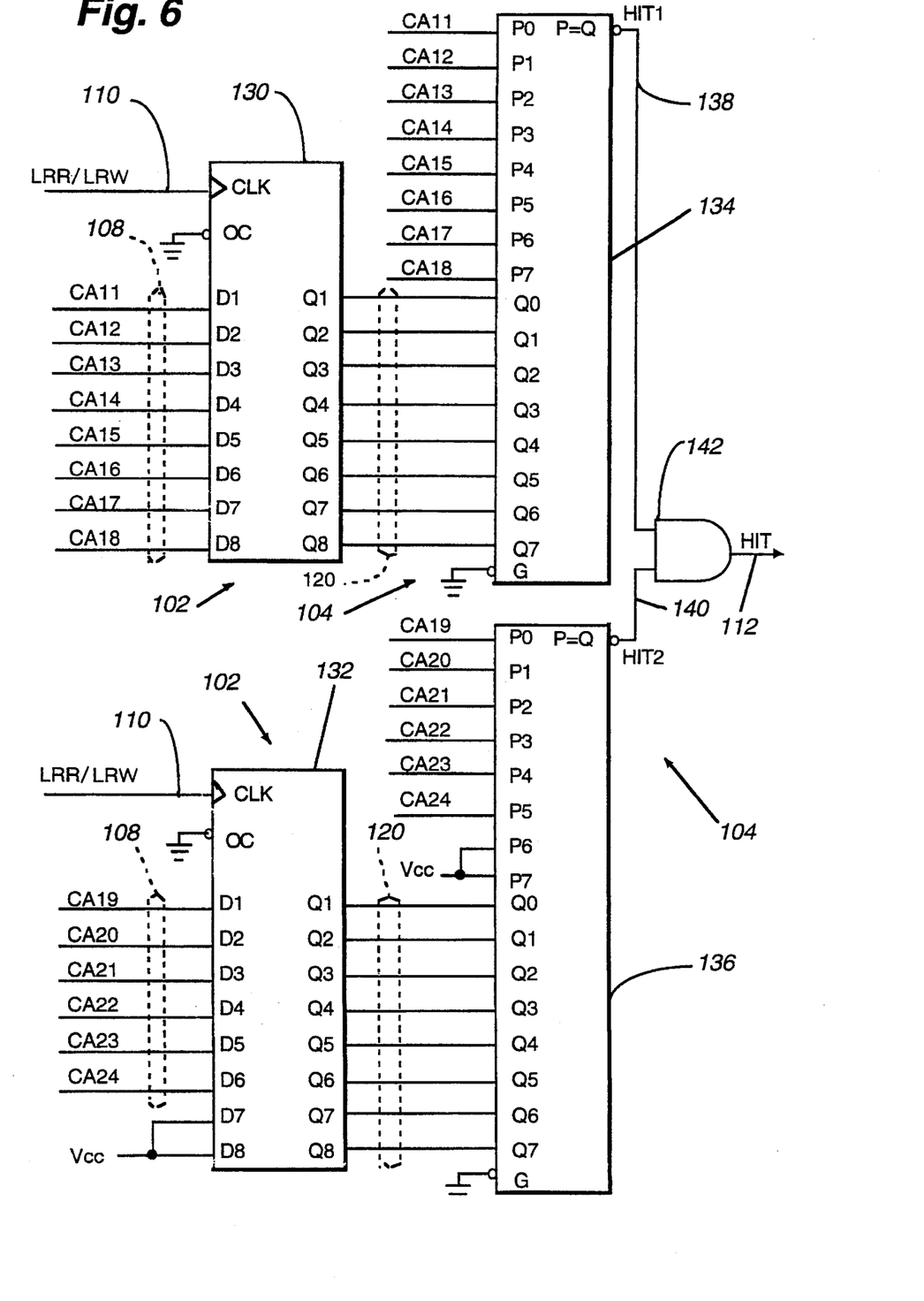
FIG. 6 is a detailed schematic diagram of a particular implementation of the n-bit register and associated n-bit comparator of the single register control circuit of the present invention utilized, for example, in conjunction with an Intel Pentium® processor.

With reference additionally now to FIG. 6, a portion of the single register control circuit 100 corresponding to the n-bit register 102 and n-bit comparator 104 of the embodiment shown in FIG. 3 is illustrated for use in conjunction with, for example, a Pentium processor 70 available from Intel Corporation, 3065 Bowers Avenue, Santa Clara, Calif. 95051. As shown, a number of address lines (CA11-24) comprise the memory address bus 108 for input to the n-bit register 102 shown comprising a pair of 74FCT574 octal D-type flipflops available from National Semiconductor Corporation, 2900 Semiconductor Drive, Santa Clara, Calif. 95051. The LRW/LRR clock input is shown as being supplied to each of the D-type flipflops at their CK (or LE) inputs thereof.

The Q outputs of the octal D-type flipflops 130 and 132 comprising, in combination, the Q output line 120 are supplied as inputs to a pair of 8-bit comparators 134, 136, which together form the n-bit comparator 104 of the single register control circuit 100 shown in FIG. 3. The 8-bit comparators 134 and 136 may be furnished as 74FCT521 8-bit identity comparators, also available from National Semiconductor Corporation. The output of the pair of 8-bit comparators 134,136 are designated as hit 1 line 138 and hit 2 line 140 respectively. Hit 1 line 138 and hit 2 line 140 are supplied as input to an AND gate 142 to provide the "hit" signal on hit line 112 as previously described.

While there have been described above the principles of present invention in conjunction with specific EDRAM devices and circuitry, the foregoing description is made only by way of example and not as a limitation to the scope of the invention.

I claim:

1. A circuit for use in conjunction with a memory controller for an integrated circuit memory device incorporating a primary memory array and a secondary cache memory, said memory device additionally including a last row accessed register for indicating an address of the last row accessed in said memory device by an associated data processor, said last row accessed register being adapted to receive a clocking signal to cause said last row accessed register to register therein an address signal applied thereto, said circuit comprising:

an n-bit register having a data input bus coupled to receive said address signal and a clock terminal coupled to receive said clocking signal to cause said address signal to be inputted into said n-bit register, said n-bit register further having an output bus for supplying a last accessed address signal registered in said n-bit register;

an n-bit comparator having first and second input terminals coupled respectively to said data input and output busses of said n-bit register, said n-bit comparator providing a first cache signal to said controller when said address and output signals are coincident and a second cache signal to said controller when said address and output signals are not coincident; and an additional register having a data input terminal coupled to receive a write/read operation signal from said associated data processor indicative of either a write or read operation to said memory device by said data processor and a clock terminal coupled to receive an operation cycle signal, said additional register having an output terminal for supplying an output signal to said controller representative of a previous state of said write/read operation signal when said operation cycle signal is in a predetermined binary state;

whereby said controller is enabled to support both cache reads and page-mode writes for said memory device.

2. The memory controller of claim 1 wherein said first cache signal is representative of a data processor I/O operation to said secondary cache memory and said second cache signal is representative of a data processor I/O operation to said primary memory array.

3. The memory controller of claim 2 wherein said data processor will read data from said secondary cache memory when said first cache signal is output from said n-bit comparator and said output signal from said additional register represents a previous "READ" operation.

4. The memory controller of claim 2 wherein said data processor will write data to said secondary cache memory when said first cache signal is output from said n-bit comparator and said output signal from said additional register represents a previous "WRITE" operation.

5. The memory controller of claim 2 wherein said data processor will read data from said primary memory array when said second cache signal is output from said n-bit comparator and said output signal from said additional register represents a previous "READ" operation.

6. The memory controller of claim 2 wherein said data processor will write data to said primary memory array when said second cache signal is output from said n-bit comparator and said output signal from said additional register represents a previous "WRITE" operation.

7. The memory controller of claim 2 wherein said data processor will read data from said primary memory array when either said first or second cache signals are output from said n-bit comparator and said output signal from said additional register represents a previous "WRITE" operation.

8. The memory controller of claim 2 wherein said data processor will write data to said primary memory array when either said first or second cache signals are output from said n-bit comparator and said output signal from said additional register represents a previous "READ" operation.

9. A computer including a central data processor and a memory controller for an associated memory module which includes a plurality of integrated circuit memory devices each incorporating a primary memory array and a secondary cache memory, said memory devices each additionally including a last row accessed register for indicating an address of the last row accessed in said memory module by said data processor, said last row accessed register being adapted to receive a clocking signal to cause said last row accessed register to register therein an address signal applied thereto, comprising:

an n-bit register having a data input bus coupled to receive said address signal, and a clock terminal coupled to receive said clocking signal to cause said address signal to be inputted into said n-bit register, said n-bit register further having an output bus for supplying a last accessed address signal registered in said n-bit register;

an n-bit comparator having first and second input terminals coupled respectively to said data input and output busses of said n-bit register, said n-bit comparator providing a first cache signal to said controller when said address and output signals are coincident and a second cache signal to said controller when said address and output signals are not coincident; and an additional register having a data input terminal coupled to receive a write/read operation signal from said associated data processor indicative of either a write or read operation to said memory device by said data processor and a clock terminal coupled to receive an operation cycle signal, said additional register having an output terminal thereof for supplying an output signal to said controller representative of a previous state of said write/read operation signal when said operation cycle signal is in a predetermined binary state;

whereby said controller is enabled to support both cache reads and page-mode writes for said memory module.

10. The computer of claim 9, wherein said first cache signal is representative of a central data processor I/O operation to said secondary cache memory of at least one of said memory devices and said second cache signal is representative of a central data processor I/O operation to said primary memory array of at least one of said memory devices.

11. The computer of claim 10 wherein said central data processor will read data from said secondary cache memory of at least one of said memory devices when said first cache signal is output from said n-bit comparator and said output signal from said additional register represents a previous "READ" operation.

12. The computer of claim 10 wherein said central data processor will write data to said secondary cache memory of at least one of said memory devices when said first cache signal is output from said n-bit comparator and said output signal from said additional register represents a previous "WRITE" operation.

13. The computer of claim 10 wherein said central data processor will read data from said primary memory array of at least one of said memory devices when said second cache signal is output from said n-bit comparator and said output signal from said additional register represents a previous "READ" operation.

14. The computer of claim 10 wherein said central data processor will write data to said primary memory array of at least one of said memory devices when said second cache signal is output from said n-bit comparator and said output signal from said additional register represents a previous "WRITE" operation.

15. The computer of claim 10 wherein said central data processor will read data from said primary memory array of at least one of said memory devices when either said first or second cache signals are output from said n-bit comparator and said output signal from said additional register represents a previous "WRITE" operation.

16. The computer of claim 10 wherein said central data processor will write data to said primary memory array of at least one of said memory devices when either said first or second cache signals are output from said n-bit comparator and said output signal from said additional register represents a previous "READ" operation.

* * * * *